Jan. 26, 1932.  W. E. HUBBARD  1,842,785

PUMP

Filed May 2, 1929  3 Sheets-Sheet 1

Inventor
William E. Hubbard
By Jack M. Ashley
Attorney

Jan. 26, 1932.　　W. E. HUBBARD　　1,842,785
PUMP
Filed May 2, 1929　　3 Sheets-Sheet 2

Inventor
William E. Hubbard
By Jack A. Schley
Attorney

Jan. 26, 1932. W. E. HUBBARD 1,842,785
PUMP
Filed May 2, 1929 3 Sheets-Sheet 3
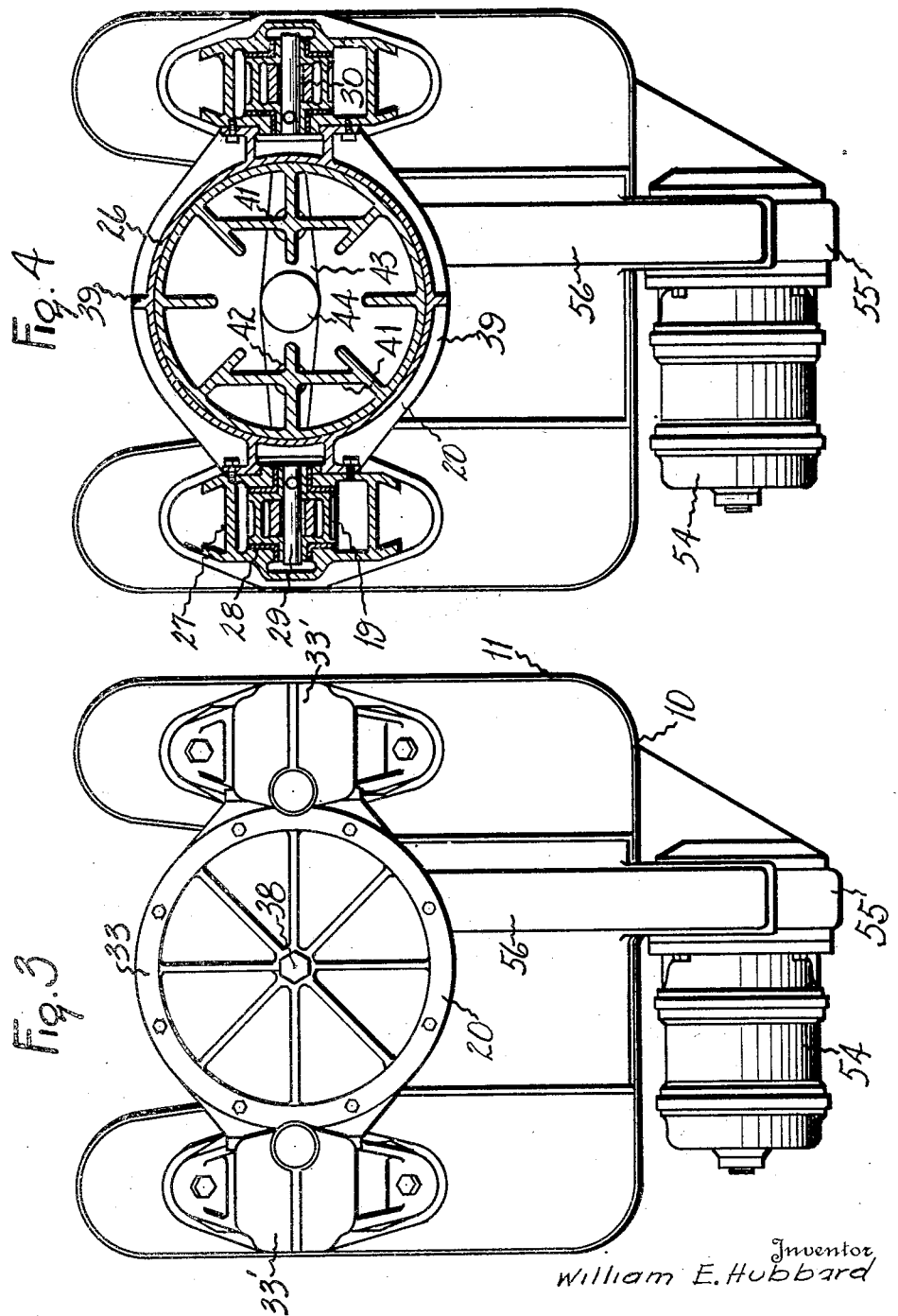
Inventor
William E. Hubbard
By Jack Ashley
Attorney Patented Jan. 26, 1932

1,842,785

UNITED STATES PATENT OFFICE

WILLIAM E. HUBBARD, OF DALLAS, TEXAS, ASSIGNOR TO THE GUIBERSON CORPORATION, OF DALLAS, TEXAS, A CORPORATION OF DELAWARE

PUMP

Application filed May 2, 1929. Serial No. 359,776.

This invention relates to a pumping power head, and particularly to a method and means for counterbalancing the dead load weight of the moving parts of the pump and its operating rod.

The invention eliminates the use of the conventional counter weighting or the provision of a compressed air reservoir, for instance as in my Patent 1,465,671 dated August 21, 1923. This avoids excessive weight at the power head and simplifies the construction thereof by obviating the use of a compressed air chamber and its cooperating mechanism.

The present invention involves the use of a single balancing cylinder and piston therein exposed at its under face to atmospheric pressure so that the downward movement of the piston with the moving pump parts suspended therefrom creates a vacuum within the cylinder, which movement is facilitated by the weight of such parts and resisted by the atmospheric pressure upon the piston. Upon the upward load lifting movement of the piston this pressure acts against the vacuum within the cylinder to compensate for the weight of the moving parts and also part of the load to be lifted with its frictional resistance in passing from a state of rest until a moving column.

The size of the piston is proportioned so that the resisting force of the atmospheric pressure holds in suspension or balanced condition all the weight of the rods and moving parts; one half the weight of the liquid load; and one half the energy required to overcome the friction of the liquid in the tubing to start its upward movement. Such an arrangement stores energy in the direction of movement altering least resistance and applies such energy in the opposite direction of movement under load, thus equalizing the pump load which permits the direct connection of a motor through gears and direct driving means.

The invention has for an object to provide a new method of balancing moving parts carried by a power pumping head consisting in creating a vacuum in the downward movement of the parts equivalent to the weight of such parts, and utilizing the atmospheric pressure against such vacuum in the upward movement of the moving parts.

A further object of the invention is to provide a novel construction including a balancing cylinder and piston therein exposed at one face to atmospheric pressure and suspending the load from such piston, whereby the travel of the piston in one direction creates a vacuum within the cylinder which reacts in an opposite travel of the piston.

Another object of the invention is to provide a vacuum creating means connected to the pump operating motor and proportioned to counterbalance the weight of the rods and moving parts, substantially one half the weight of the load to be lifted and substantially one half of the energy required to move such load from a state of rest.

A still further object of the invention is to present a new construction of power head including a balancing cylinder open at its lower end, a piston within the cylinder and exposed at its lower face to atmospheric pressure, a cross head carrying the moving pumping parts and connected to said piston, and a crank driving member having a connection for reciprocating said head.

A further object of the invention is to provide an improved driving connection to insure true travel of the piston within the cylinder and the accurate alinement of the pump rod, and consisting of slide blocks operating upon tracks at opposite sides of the cylinder and actuated by pitman connections from the crank members, said blocks being connected to the beam carrying the moving parts by rigid hangers and the beam connected to the piston by rigid rods.

Other and further objects and advantages of the invention will be hereinafter set forth and the novel features thereof defined by the appended claims.

In the drawings:

Fig. 3 is a top plan view,

Fig. 4 is a cross section on the line 4—4 of Fig. 1, and

Like numerals refer to like parts in the several figures of the drawings.

Figure 1:
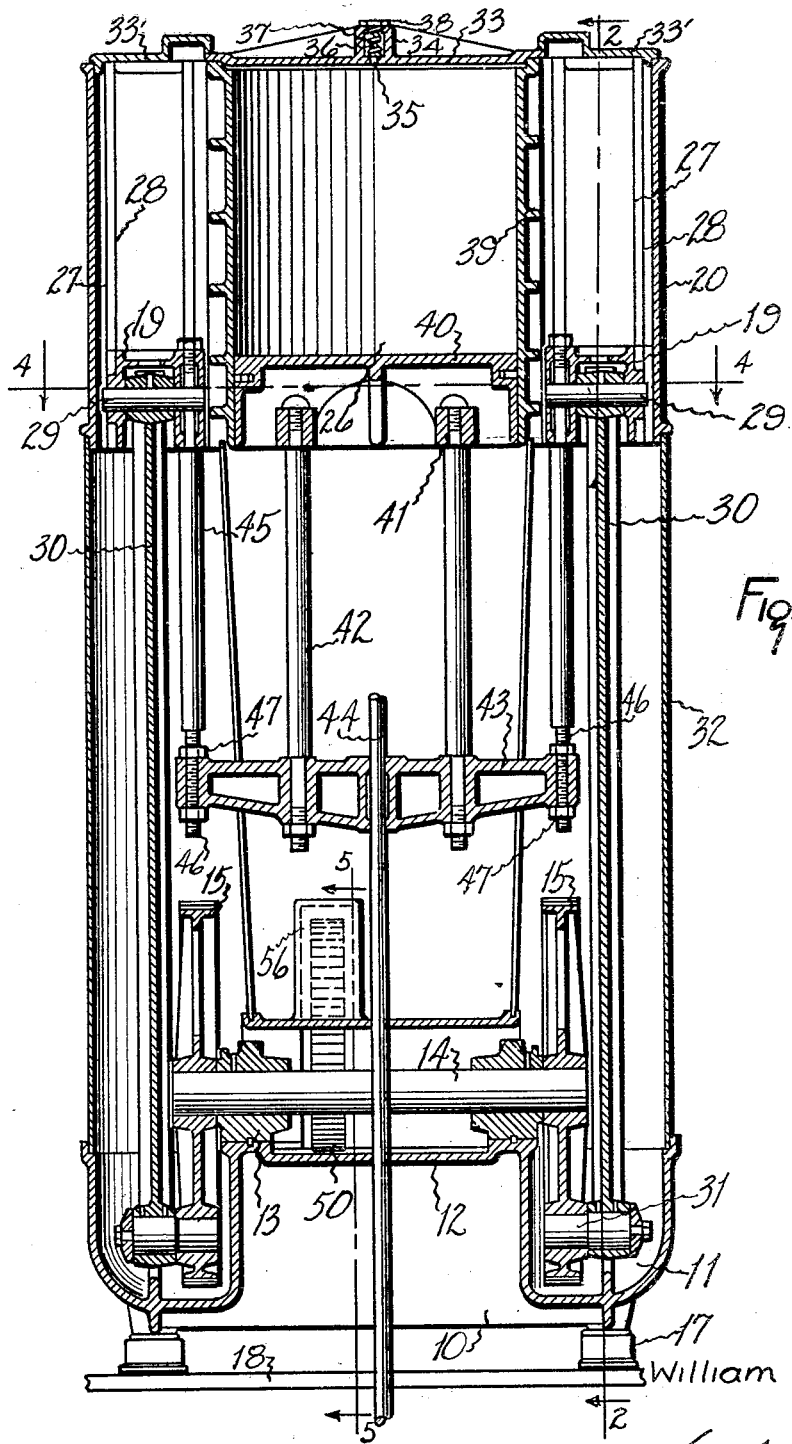
Fig. 1 is a vertical section through the power head.

The invention is adapted for various applications and in the form herein shown, which has been found very efficient in operation, the base 10 is formed at opposite sides with oil tubs 11 and has a connecting web 12 which supports bearings 13 for a drive shaft 14 carrying at its opposite ends the gears 15. The under face of the base is provided with ball feet 16 which seat in concave rest plates 17 supported by any desired type of platform 18 at the top of the well. Such construction does not require any special foundation nor changes in the standard casing head and its stuffing box equipment, while the power head can be removed from the well as a unit by disconnection of the pump rod therefrom.

The balancing head 20 may be supported from the base by any preferred means, such as the posts 21 secured at their lower ends to a flange 22 of the base by tap screws 23, and is similarly secured at their upper ends to a flange 24 of the head by screws 25. This head comprises a central balancing chamber 26 having at opposite sides enclosed chambers 27 formed with trackways 28 for the slide blocks 19. These blocks carry a pivot pin 29 for the upper end of the pitman 30 which is pivotally mounted at its lower end upon the crank pin 31 on the gear 15. This gear and pin comprise in effect a crank member to impart reciprocating motion to the slide block. The pitmans may be suitably enclosed by a casing 32 extending from the base to the head.

The balancing cylinder 26 is open at its lower end and closed at its upper end by an air tight cover plate 33 which also extends at 33' over the chambers 27. Above the cylinder the plate is provided with a casing 34 having a vent opening 35 into the cylinder which vent is closed by a valve 36 normally held closed by a spring 37 retained under tension by an open cap 38 threaded into the casing 34, and may be thus adjusted to vary the tension of the spring upon the valve. The outer surface of the cylinder is formed with circumferential ribs 39 for reinforcing the cylinder so as to withstand the atmospheric pressure thereon.

The balancing piston 40 is disposed within the cylinder and provided with a suitable packing to effect an airtight contact with the cylinder wall. The outer or under face of this piston is exposed to atmospheric pressure and formed with radially extending ribs 41, Figure 4, from which rods 42 extend to the cross beam 43 to which the pump rod 44 and moving parts carried thereby are secured. This beam is suspended from the slide blocks by the hangers 45 bolted thereto and formed with threaded lower ends 46 upon which the beam may be adjustably secured by means of nuts 47, to properly determine the position of the piston within the cylinder.

Figures 2, 5:
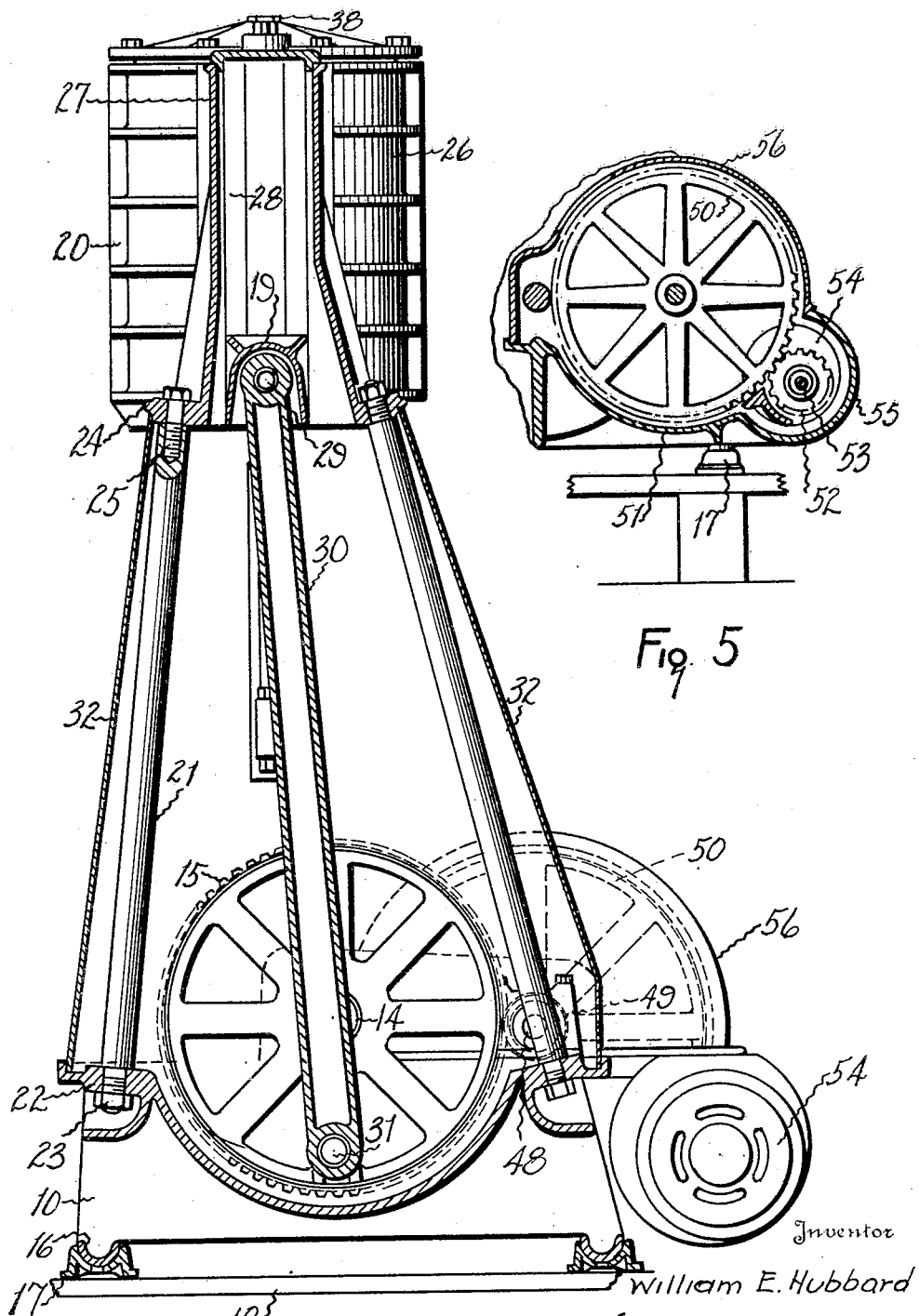
Fig. 2 is a section at a right angle to Fig. 1 on the line 2—2 thereof.
Fig. 5 is a detail section on the line 5—5 of Fig. 1.

The driving connection for the gears 15 may be of any desired character, a preferred construction being a countershaft 48 extending parallel to the shaft 14 and carrying pinions 49 meshing with said gears. The countershaft is provided intermediate its ends with a reducing gear 50 operating in an oil trough 51 extended from the base, and the gear 50 meshes with a gear 52 on the shaft 53 of a suitable motor 54. The gear 52 operates in an extension 55 from the trough 51 so that the several rotating parts are constantly lubricated which reduces friction and insures quiet operation. The gear 50 and the shaft 14 are enclosed by a suitable casing 56, as shown in Fig. 2. The equalizing of the pump load permits the use of a proper type of electric motor which is particularly desirable in this class of work.

The general operation of the apparatus and application of the method will be seen from the foregoing description, and it is desirable that the balancing cylinder and piston be so proportioned as to counterbalance the weight of the pump rods and several parts carried thereby and also a portion of the weight of the liquid load to be lifted. Further the atmospheric pressure against the vacuum on the upstroke should be sufficient to supply a portion of the energy required to overcome the friction of the liquid in transferring from a state of rest into an upwardly moving column. The valve at the closed end of the cylinder permits the ejection on the upstroke of any air collecting therein so as to effect a more perfect vacuum on the downstroke of the piston.

Since the pump rod is connected to the balancing piston it is important to insure true rectilinear travel of the parts and this is accomplished by the opposite slide blocks and rigid connections with the piston and beam. The power head is of a portable character and its simple light construction reduces inertial shocks and stresses resulting in a compact, quiet and economically operating pumping unit.

The method involved may be applied by different forms of apparatus, and while the specific construction of one form has been shown and described, the invention is not confined thereto as changes and alterations may be made therein without departing from the spirit of the invention as recited in the following claims.

What I claim, is:

1. In a pumping power head, a balancing cylinder, a piston therein exposed at one face to atmospheric pressure, pump operating means connected to the piston, trackways at opposite sides of the cylinder, slide blocks upon said trackways, hangers from said blocks to said operating means, and driving means for actuating said blocks.

2. In a pumping power head, a balancing cylinder, a piston therein exposed at one face to atmospheric pressure, pump operating means connected to the piston, trackways at opposite sides of the cylinder, slide blocks upon said trackways, rigid hangers from said blocks to said operating means, a drive shaft having crank members at each end, and pitman connections from the crank members to the slide blocks.

3. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and having extensions rigidly connected to said beam, and pitmans pivotally connected to the slide blocks and to crank pins on said gears.

4. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and having extensions rigidly connected to said beam, pitmans pivotally connected to the slide blocks and to crank pins on said gears, a countershaft having pinions meshing with said gears, a reducing gear upon the countershaft, and a motor having its shaft geared to said reducing gear.

5. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and having extensions rigidly connected to said beam, pitmans pivotally connected to the slide blocks and to crank pins on said gears, a countershaft having pinions meshing with said gears, a reducing gear upon the countershaft, a motor having its shaft geared to said reducing gear, and oil troughs upon the base into which the lower portion of the several gears extend.

6. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and rigidly connected to said beam, pitmans pivotally connected to the slide blocks and to crank pins on said gears, and opposite oil troughs upon the base disposed to receive a portion of said gears and pitman connections thereto.

7. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and rigidly connected to said beam, pitmans pivotally connected to the slide blocks and to crank pins on said gears, and enclosing casing for said gears and pitmans extending from the base to the head.

8. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and rigidly connected to said beam, pitmans pivotally connected to the slide blocks and to crank pins on said gears, and reinforcing ribs upon the outer surface of said cylinder.

9. In a pumping power head, a base, a drive shaft mounted thereon and having gears at opposite ends, a head supported from said base and comprising a vacuum cylinder with trackways at opposite sides thereof, a pumping beam, a piston within the cylinder rigidly connected to said beam, slide blocks traversing the trackways and rigidly connected to said beam, pitmans pivotally connected to the slide blocks and to crank pins on said gears, and means for adjusting the slide block connections relative to said beam.

10. As a sub-combination in a pumping power head, a base provided with ball foot members, concave seats to receive said members, driving means supported upon the base, a head mounted thereon and provided with operating means connected to said driving means.

11. In a pumping power head, a base provided with connecting flanges, driving means supported upon the base, a head formed at its base with connecting flanges and provided with a cylinder and piston, means connecting said piston with the driving means, and supporting posts for the head detachably connected to the flanges upon the base and head.

In testimony whereof I affix my signature.

WILLIAM E. HUBBARD.